United States Patent
Davies

[15] 3,683,657
[45] Aug. 15, 1972

[54] PIPE FITTING TOOL
[72] Inventor: Fred Davies, 72 Maxwell Ave., Orange, New South Wales, 2800, Australia
[22] Filed: May 18, 1970
[21] Appl. No.: 38,120

[30] Foreign Application Priority Data

May 23, 1969 Austria..................55,495/69

[52] U.S. Cl. .....................72/112, 29/157.4, 72/479, 72/481
[51] Int. Cl...........................B21d 1/02, B21d 37/04
[58] Field of Search................72/479, 476, 481, 112; 29/157.4, 157.5, 157

[56] References Cited

UNITED STATES PATENTS

| | | |
|---|---|---|
| 2,213,574 | 9/1940 | Weston..................72/479 |
| 3,468,147 | 9/1969 | Davies..................72/112 |

Primary Examiner—Charles W. Lanham
Assistant Examiner—R. M. Rogers
Attorney—Robert E. Burns and Emmanuel J. Lobato

[57] ABSTRACT

A pipe fitting tool comprises a former having a head and a shank. The head has a recess allowing insertion through a hole in the wall of a pipe although the width of the head is greater than the greatest width of the hole. The former may then be rotated and withdrawn from the hole to form an annular flange around the hole for insertion of a branch pipe.

7 Claims, 5 Drawing Figures

PIPE FITTING TOOL

This invention relates to improvements in pipe fitting tools and in particular to tools for preparing a length of pipe for the insertion of a branch pipe intermediately of its ends. As will be seen from the ensuing description, it is of use on thin-walled pipes such as copper, bronze or aluminum pipes where screw-threaded sockets and other screwed fittings are not normally used. It is applicable also however, to pipes of tougher walling.

The object of the invention is to provide a ready means whereby a branch pipe may be simply and conveniently inserted in and secured to another pipe of the same or larger diameter.

According to the invention there is provided a pipe fitting tool including a former having a head and a shank and a recess in said head enabling the head to be inserted through a hole made in the wall of a pipe, the greatest transverse cross-sectional distance across said head being greater than the width of said hole so that said former may be rotated and said head withdrawn outwardly against the periphery of said hole to form an annular flange projecting externally of said pipe.

A preferred form of the invention will now be described in detail with reference to the accompanying drawings of which:

Figure 1:
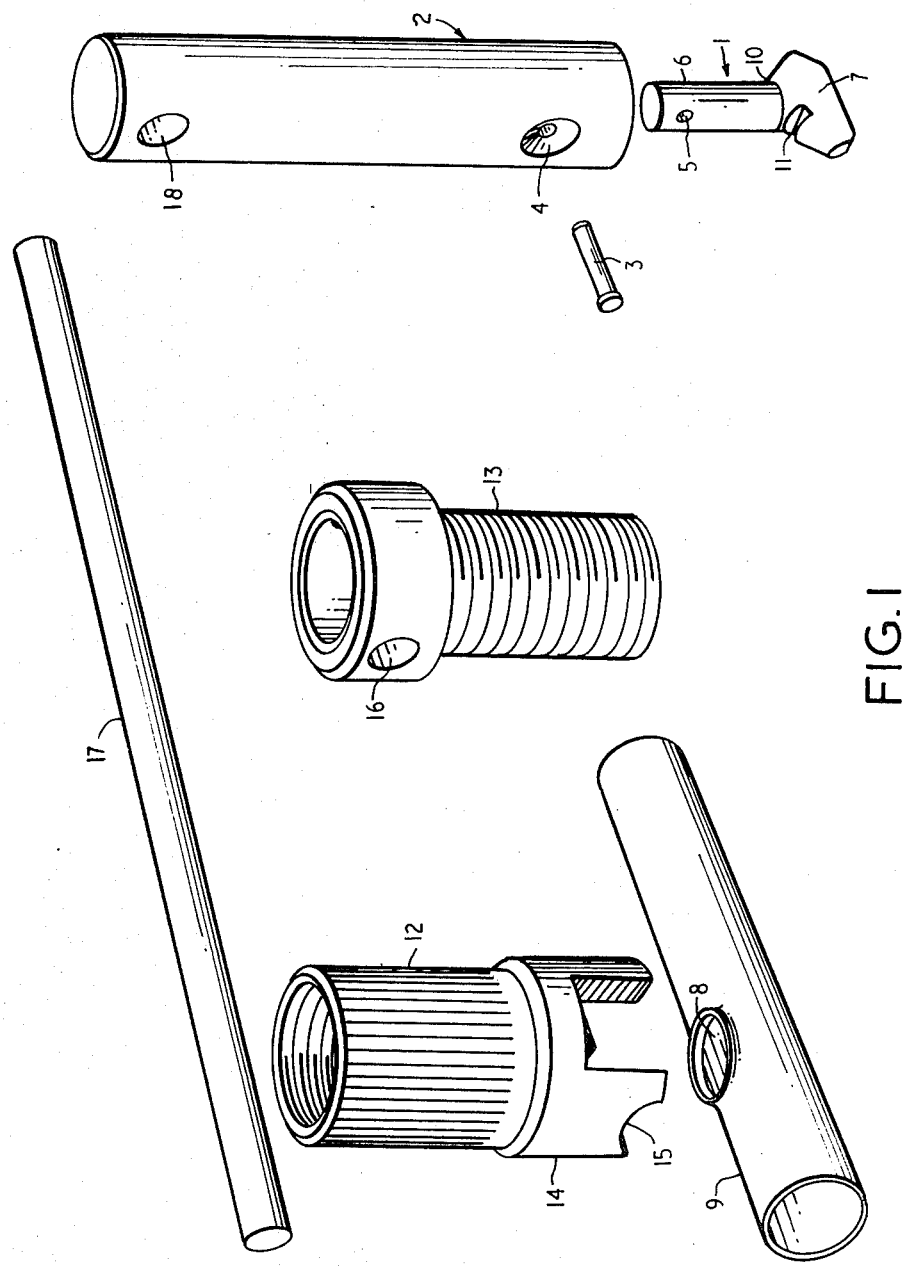
FIG. 1 depicts the disassembled parts of the pipe fitting tool, ancillary apparatus, and piping to which the tool has been applied.

In the preferred form of the invention, the pipe fitting tool comprises a former denoted generally 1, a former holder 2 and a locking pin 3. The former 1 is placed within a cylindrical recess in one extremity of the former holder and locked therein by inserting locking pin 3 through apertures 4 and 5 in the former holder and former respectively.

The former holder is adapted for connection in a saddle jack as will be described in due course. In an alternative form of the invention however, the former may be shaped for direct use with the saddle jack without intervention of a former holder.

It may also be noted at this point that where a former holder is used other forms of connection to the former may be used, such as a bayonet fastening. (The diametrically opposed lugs for such a fastening would preferably be positioned on the former.)

The former illustrated in the drawings has a substantially cylindrical shank 6, one end of which is adapted for insertion in the former holder 2 as described above. The shank 6 has at its other extremity a head 7 for insertion through a circular hole 8 in the wall of a pipe 9.

This invention lies in the fact that the shape of the head 7 of the former is such that it may be inserted within a hole of lesser diameter than the greatest transverse cross-sectional distance across the head. Thus shaped the head may be withdrawn in a lifting turning motion to form an annular flange projecting externally of the pipe.

Figure 4:
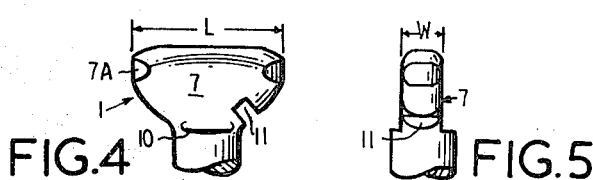
FIG. 4 is an enlarged lengthwise view of the former head.
Figure 5:
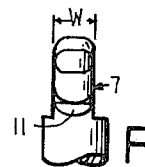
FIG. 5 is an enlarged side view of the former head.

The shape of the head is particularly illustrated in FIGS. 4 and 5. From FIG. 4 may be seen that the transverse cross-sectional length L of the head increases from the neck of the former (that is the junction between head and shank) toward the end of the former except that near the neck is a recess 11 in the shape of a deep notch or slot. This is provided to enable entry of the head to the inside of the tubing. The notch or slot 11 extends from near the neck on one short side of the head toward the furtherest extremity of the head on the other short side thereof. It thus slants at an angle to the longitudinal axis of the shank. The depth of the recess will be such that the distance from the floor of the recess to the remote extremity of the opposite short side of the head will be less than the width of the hole.

Figure 2:
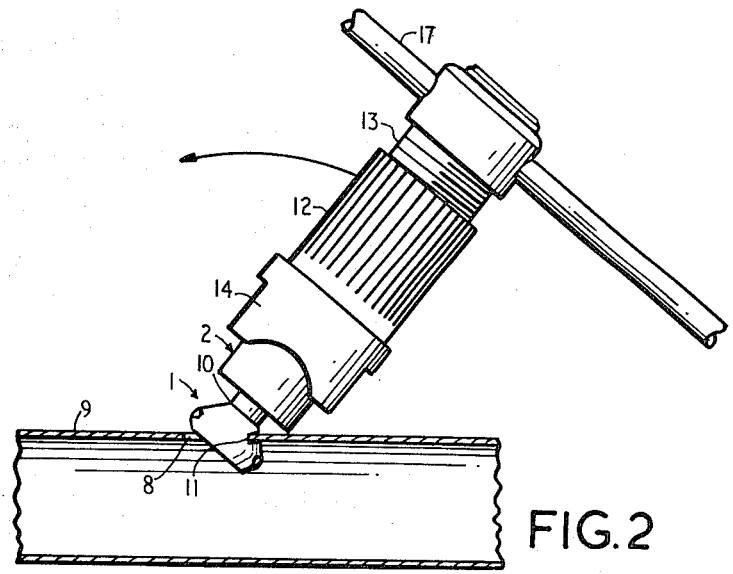
FIG. 2 shows one stage in the insertion of the tool within a pipe.
Figure 3:
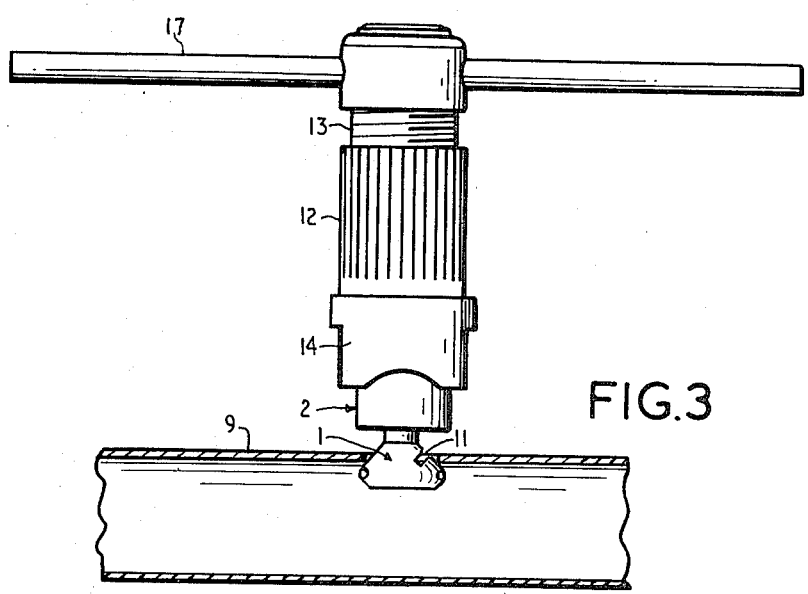
FIG. 3 shows the tool in position within the pipe.

Having the shape just described the slot will engage the edge of the hole 8 and allow the head to be pivoted from the position shown in FIG. 2 to that shown in FIG. 3.

The manner in which the cross-sectional length of the former head increases toward the extremity of the head is not essential to the invention. However best results are obtained where the side of the head, angles sharply outward from the neck and then curves in an arc until adjacent the longitudinal extremity of the head. The opposite short sides are ground at 7A so as to be parallel. Having the sides parallel prevents the head from accidentally slipping from the tubing when the annular flange approaches its maximum width.

Alternatively the short sides of the former head could form segments of a sphere or cone. The long sides are substantially flat but with rounded edges.

The transverse cross-sectional width W of the head may conveniently be substantially the same as, or a little less than the cross-sectional diameter of the shank (as shown in FIG. 5). In any case the width W of the head will be smaller than the width of the hole through which the head is to be inserted. It also follows that the width of the head will be less than the inside diameter of the formed annulus.

The transverse cross section of the head is generally rectangular in shape but with rounded corners.

Means are provided for rotating the former whilst it is held with its axis at right angles to the longitudinal axis of the pipe and drawing it through the hole in the pipe to form a flange. Conveniently a saddle jack is used. Such a jack may comprise an internally threaded external sleeve 12 engageable with an externally threaded internal sleeve 13. The external sleeve 12 is bifurcated at 14 and each of the bifurcate arms has an arcuate recess 15 so that it will rest snugly on the exterior of the pipe with the sleeve straddling the hole formed in the wall of the pipe. The opposite end of the internal sleeve 13 has a collar with apertures 16 for insertion of a tommy bar 17. In using the tool to form a circular flange to which a branch pipe may be attached, the hole 8 is first drilled or cut in the pipe 9 and the former head 7 inserted. Best results will ordinarily be obtained if the hole is slightly elongated, with its greatest width along the longitudinal axis of the pipe. The formers will usually be provided in sets and a former will be chosen for the job in hand which has a width slightly greater than the diameter of the hole. Before inserting the head it may be lubricated.

The head 7 is manipulated through the hole by firstly inserting one short side of the head within the hole so that the recess 11 engages the adjacent side of the hole as shown in FIG. 2. The shank is then at an angle to the pipe. It is next pivoted so as to be at right angles to the pipe as shown in FIG. 3, the other short side of the head entering the hole so that the whole head is within the hole.

The saddle jack is next passed over the former holder and former so that its arcuate bifurcations engage the outside wall of the pipe and rest thereon.

The apertures 16 and the inner sleeve collar are next aligned with an aperture 18 in the former holder, and the tommy bar 17 is passed through these apertures. The tommy bar is then rotated causing the former, former holder and inner sleeve to rotate also, and the curved sides of the former head are drawn against the interior of the pipe and then outwardly through the pipe to form an annular flange. The size of the hole is increased at the same time to such size as is required to enable a branch of the desired size to be inserted therein and be secured as by silver soldering in the known way.

If desired of course the former, former holder and saddle jack can be pre-assembled before application to the pipe. This arrangement is in fact consistent with FIG. 3.

If sleeve pipe material such as stainless steel piping is used a saddle jack may be needed which allows independent rotation and withdrawal operations. In this case the inner sleeve may be provided with a freely rotatable collar at its outer extremity for engagement with the tommy bar, and the inner sleeve is also provided with its own independent lifting handles.

In some forming operations it may be necessary to lubricate the edges of the piping as the forming proceeds. This can be done through suitable apertures in the jack.

The forming operation may also in some instances be considerably facilitated by an initial annealing of the piping.

Although drill sizes and former dimensions form no part of the invention, it will be appreciated by those skilled in the art that as different sizes of holes will be necessary to adapt the invention to different sizes of pipe and/or branches, and as the former requires to be passed through the hole in the wall of the pipe, different sizes of formers will be required for different circumstances. These will, however, be obvious to those skilled in the art.

What I Claim is:

1. In a pipe fitting tool including a former for insertion through a hole in a pipe, and for being rotatably withdrawn to expand the hole to form an externally projecting annular flange at the periphery thereof, the improvement wherein said former comprises a forming head, a shank connected to said head and having a maximum cross-sectional dimension at said connection to said head which is less than that of said hole, said head being elongated in a direction normal to a rotative axis of said shank and having a length measured from one end to the other cross-section said elongated direction which is greater than the maximum cross-section dimension of said hole, and having a width disposed normal to both said shank axis and said length, said head width being less than said maximum dimension of said hole, and wherein said head has an elongated recess therein disposed in a surface thereof adjacent said connection to said shank for receiving therein an edge portion of the pipe at said hole, thereby enabling the head to be inserted through the hole.

2. A pipe fitting tool according to claim 1, wherein said elongated recess is aligned in its lengthwise direction substantially normal to said elongated dimension of said head and has a depth which extends angularly with respect to the shank axis from said head surface adjacent the shank toward one of said ends of said head on the opposite side on said shank from said head surface adjacent said shank.

3. A pipe fitting tool according to claim 2, wherein the depth of the recess is such that the distance from the floor of the recess to said one end of the head is less than said maximum dimension of the hole.

4. A pipe fitting tool according to claim 3, wherein said connection of said shank to said head is centered intermediate said ends of said head, and said head is tapered toward said respective longitudinal ends of the head and away from said shank on surfaces of said head which are longitudinally opposed of said shank.

5. A pipe fitting tool according to claim 4, wherein said tapered surfaces are arcuate in cross section.

6. A pipe fitting tool according to claim 5, wherein said longitudinally spaced ends of the head have substantially parallel surfaces.

7. A pipe fitting tool according to claim 6, wherein the transverse extremities of the head are substantially flat.

* * * * *